INVENTORS
ERICH HÜBINGER,
BY MAX SCHNEIDER
& HORST WEIMAR
By Bair, Freeman & Molinare Attys.

United States Patent Office 3,514,060
Patented May 26, 1970

3,514,060
MEASURING HOSE MOUNTING DEVICE
Erich Hubinger, Nentershausen, Max Schneider, Wattenheim, and Horst Weimar, Heistenbach, Germany, assignors to ELMEG, Elektro-Mechanik G.m.b.H., Peine, Germany, a corporation of Germany
Filed Feb. 2, 1968, Ser. No. 702,692
Claims priority, application Germany, Feb. 2, 1967,
H 57,881
Int. Cl. F16l *3/12, 7/00*
U.S. Cl. 248—76
6 Claims

ABSTRACT OF THE DISCLOSURE

This invention relates to a mounting device for a hose, used in traffic counting mechanisms, which comprises a hook, a ring attached to one end of the hook, and a connecting tube having a tapered frusto-conical end, the ring having an inside diameter sufficient to permit passage of said hose therethrough but insufficient to permit the passage of the hose when the tapered frusto-conical end of the connecting tube has been inserted into the hose whereby the hose is mounted on said device by pulling the hose and tube into wedging relationship with the ring after the connecting tube has been inserted into the hose.

---

Figure 1:
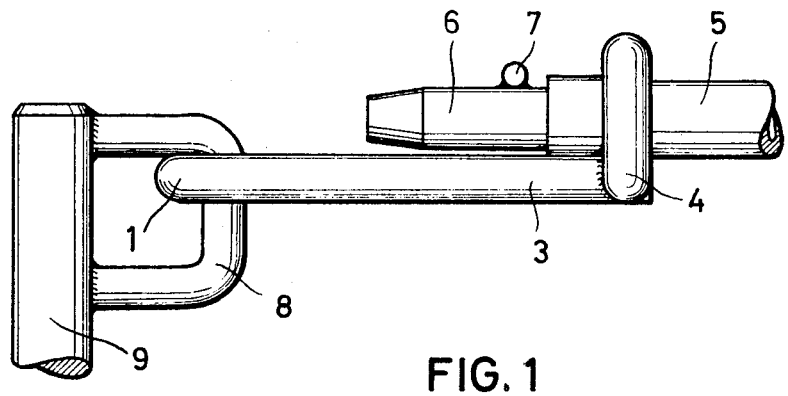
Figure 1:

The invention relates to measuring hose mounting supports and in particular to such mounting supports for traffic counting devices.

Measuring tubes for the measurement of pressures exerted upon them are employed in many fields. They are, for example, used in large numbers in traffic counting devices to count the number of vehicles which drove across a certain street per unit of time on a given date. Some of these traffic counting devices can distinguish the vehicles which crossed the device with respect to their axle load by the different pressure exerted upon the hose. During the crossing of the hose, an increased pressure occurs in the hose which is, for example, communicated to a pressure box which transforms the pressure into an electrical signal. The electrical signals are then conveniently counted in a recording mechanism.

For traffic counting purposes, such measuring hoses are laid across the street and are closed at one end and fastened to an anchoring means at the edge of the street by means of clamps. For example, the pressure measuring hose may be clamped to a bar connected with a ground anchor. In such prior art arrangement, the clamps grip the end of the hose to be fastened and the clamps are then attached to the bar by means of screws. A pressure box and the recording mechanism are then connected to the open hose end, for example through a connection hose.

The above described mounting of the measuring hoses is extremely disadvantageous: First, the clamping of the measuring hoses by means of clamps requires a relatively large operating expenditure in that measuring hoses can be fastened and removed only relatively slowly, thus requiring a considerable expenditure of working time. Since the measuring hose often must be removed from the street for a short period of time to prevent damages when, for example, heavy-chained vehicles in the winter or snow-removal vehicles are using the street. Secondly, when clamps are used, these hoses are clamped between relatively sharp edges of the clamps in unyielding and rigid manner. As a result, extensive damages are frequently inflicted on the hose, especially when heavy traffic is thrashing the free end of the hose.

According to the present invention, the above disadvantages are eliminated by a measuring hose mounting which consists of a ring—attached to a connecting means which can be hooked in—with an inner diameter which corresponds approximately to the outer diameter of the hose, and a connecting tube or a pipe nipple having at at least one tapered end, e.g., a frusto-conical end. In mounting a hose onto such a device, the frusto-conical end of the nipple is inserted into the open end of the measuring hose and the assembly is then clamped into the ring by pulling that portion of the hose containing the nipple through the ring.

By the use of the above described mounting, the pressure measuring hose may be quickly put into operation by pushing a short portion of the open end of the hose through the ring, inserting the tube nipple into the open hose end, then pulling the hose and the nipple back through the ring. The connecting piece can be then hooked in. When the measuring hose must be removed for a short period of time, only the connection piece needs be unhooked to remove the entire measuring hose assembly from the street. A further advantage resides in the feature that the measuring hose is fastened like a hinge through the connection piece which can be hooked in so that in case of stress, it can give way and, because of this yielding, a hose connected to a mounting of the present invention is not easily damaged. In addition, the mounting according to the invention may be attached to either of the two hose ends since a closed pipe nipple can be used for the closed end of the hose.

A further advantageous characteristic of the device according to the invention becomes apparent when the measuring hose is used for traffic counting devices where the measuring hose has to be fastened at the sides of the streets: the connection piece of the present device is a hook which can be hooked onto a vertically extending closed loop attached to a ground anchor so that the plane surface circumscribed by the ring extends approximately perpendicularly to the longitudinal direction of the hose. Due to this arrangement, when tension loads are applied to the hose, the hose end with the pipe nipple is always pulled into the ring perpendicularly so that here no twisting or torsion can occur which can lead to an early wear or damage of the hose and that the exact mounting of the hose and of the pipe nipple in the ring is also guaranteed. In this arrangement, the connection of the hook with the loop of the ground anchor has the effect of a three-dimensional joint.

For the further protection of the hose ends, it is proposed that the ring be of round cross-section so that no sharp edges act upon the hose end. In addition to this, it is advantageous to place a lever on the pipe nipple, extending approximately radially from the pipe nipple, so that when the tapered end of the nipple is being inserted into the hose and ring greater torque can be applied. In this manner, the introduction of the nipple into the hose end is facilitated.

Figure 2:
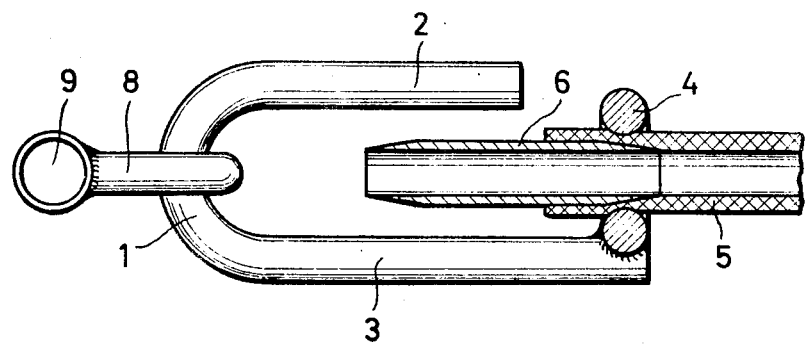

Further details of the invention are explained by means of the drawing in which:

FIG. 1 is a front elevation view of a hose end with a pipe nipple and hook in a mounted position, the hook being hooked into the loop of a ground anchor; and FIG. 2 is a top view, partly in section, of the measuring hose mounting according to the invention shown in FIG. 1.

In the example shown in the drawing, a U-shaped hook 1 is shown which possesses a short arm 2 and a long arm 3. A ring 4 made of rounded material is welded radially to the end of arm 3 not attached to the arm 2. An end of a measuring hose 5 is introduced into ring 4 and a pipe nipple 6 is inserted into the open end of the hose. The pipe nipple 6 possesses frusto-conical ends so that when the measuring hose 5 is pulled back through the ring 4, the hose is clamped tightly and wedged into this ring. In this arrangement, the outer diameter of the pipe nipple 6 and the inner diameter of the ring 4 are proportioned in such a manner so that the portion of the measuring hose containing the conical end of the nipple cannot slide through the ring 4.

For facilitating the insertion of the pipe nipple into the end of the measuring hose 5 and for the easier application of a connection hose to a measuring device, such as for example a pressure box at the other cone end of the pipe nipple, a lever 7 extending radially from the nipple is provided approximately on the middle of the pipe nipple. By the use of this lever during the insertion of the pipe nipple into a hose end, a large torsional moment can be exerted upon the pipe nipple. Before hook 1 is attached to the ground anchor, the pipe nipple 6 is placed into a position so that the lever 7 is located on the side of the pipe nipple facing away from both arms 2 and 3 of hook 1. In this manner, hook 1 is opened at its shorter arm 2 so that it can be easily hooked, or unhooked, into a vertically extending loop 8 of a spike or a ground anchor 9.

It is evident that the invention in question is not limited to the specific example shown above. Thus, the loop on the ground anchor can also extend horizontally without impairing the effect of a tridimensional joint between the hook and the loop. In addition, the function of the hook 1 and of the loop 8 can be interchanged, i.e., the hook can be constructed in closed fashion, for example by making arm 2 the same length as arm 3 and welding arm 2 to the ring 4. Naturally, the loop 8 then must possess an opening for the insertion of the hook. Such an opening on the loop can be provided by deleting the welding connection between the upper arm of the loop 8 and the ground anchor 9.

The loop 8, or a corresponding element, can also be attached to a device other than a ground anchor. As a further embodiment of the invention, the ring 4 may extend, not radially and vertically, but slightly inclined to the arms 2 and 3 of hook 1. In such a case, when the measuring hose end is clamped into ring 4, the mounting of a connection hose onto the pipe nipple 6 is facilitated since access to the pipe nipple end to be used for this purpose is not obstructed by the bend in the hook. However, the inclining of the ring with respect to the hook is not normally necessary, and the clearance of the pipe nipple end not connected with the measuring hose from the hook can also be attained in a different manner, for example by the use of a spacing element between hook and ring. An inclined ring 4 is associated with the disadvantage that when tensile loads are applied to the measuring hose, the measuring hose end is bent and strained in an uneven manner which would result in quick wearing and damage to the hose.

We claim:

1. A mounting device for a hose used in traffic counting mechanisms comprising, in combination: a connecting means for connecting said mounting device to an anchoring means, a ring attached to said connecting means, a connecting tube having one end thereof tapered to facilitate the insertion of said end of the connecting tube into an end of said hose, said ring having an inside diameter sufficient to permit passage of said hose therethrough but insufficient to permit passage of said hose when said end of said tube has been inserted into said hose whereby said hose is mounted on said device by pulling said hose and said tube into wedging relationship with said ring after said tube has been inserted into said hose.

2. A mounting device according to claim 1 wherein said tapered end is tapered in frusto-conical configuration.

3. A mounting device according to claim 2 wherein said connecting means is a U-shaped hook, and said ring extending radially from the end of an arm of said hook.

4. A mounting device according to claim 3 wherein said ring having a substantially smooth rounded cross section to prevent damage to said hose.

5. A mounting device according to claim 3 wherein said connecting tube having a lever attached thereto, said lever extending radially from said connecting tube to provide a surface to which torque can be applied.

6. A mounting device according to claim 3 wherein said anchoring means comprises a spike having an upper end and a lower end, said lower end having substantially conical configuration for insertion into earth, a closed loop integrally attached to said upper end, said hook being receivable in said loop for anchoring said hose when said lower end of said spike is driven into earth.

References Cited
UNITED STATES PATENTS

| | | | |
|---|---|---|---|
| 367,790 | 7/1887 | Darrah | 285—242 |
| 2,939,671 | 6/1960 | Beekman | 248—75 X |
| 3,022,095 | 2/1962 | Mazeika | 285—45 |
| 3,262,721 | 7/1966 | Knight | 285—242 X |

CHANCELLOR E. HARRIS, Primary Examiner

U.S. Cl. X.R.

285—242